United States Patent [19]

Wiggins

[11] 4,243,707
[45] Jan. 6, 1981

[54] ADHESION PROMOTER FOR ACRYLONITRILE COPOLYMER LATEX COATINGS

[75] Inventor: Wayne T. Wiggins, Aurora, Ohio

[73] Assignee: Standard Oil Company, Cleveland, Ohio

[21] Appl. No.: 47,509

[22] Filed: Jun. 11, 1979

[51] Int. Cl.³ .............................................. B05D 3/02
[52] U.S. Cl. ................. 427/388.4; 252/352; 260/29.6 TA
[58] Field of Search .................. 252/351, 358, 352; 427/388 C, 388 R, 421; 156/325; 260/29.6 TA, 45.7 P; 526/342, 328; 428/463, 462

[56] References Cited

U.S. PATENT DOCUMENTS

| | | | |
|---|---|---|---|
| 2,873,212 | 2/1959 | Roeser | 428/463 |
| 4,103,049 | 7/1978 | Nishida et al. | 427/341 |
| 4,110,285 | 8/1978 | Pons et al. | 260/45.7 P X |
| 4,133,823 | 1/1979 | Joyce, III et al. | 260/45.7 P X |
| 4,136,075 | 1/1979 | Finn et al. | 427/388 C X |
| 4,140,836 | 2/1979 | Wallace | 427/588 C X |
| 4,141,873 | 2/1979 | Dohany | 260/29.6 F |

FOREIGN PATENT DOCUMENTS

| | | | |
|---|---|---|---|
| 873876 | 8/1961 | United Kingdom | 427/388 C |
| 1188814 | 4/1970 | United Kingdom . | |

*Primary Examiner*—Ronald H. Smith
*Assistant Examiner*—Thurman K. Page
*Attorney, Agent, or Firm*—William D. Mooney; Herbert D. Knudsen; Larry W. Evans

[57] ABSTRACT

In the coating of the surface of metal substrates with an acrylonitrile copolymer from an aqueous latex of said copolymer, the adhesion of the copolymer to the metal surface is improved by the inclusion in the latex of a condensation product of certain metal hydroxides or borates with a certain type of phosphate emulsifier.

4 Claims, No Drawings

ADHESION PROMOTER FOR ACRYLONITRILE COPOLYMER LATEX COATINGS

This invention relates to an adhesion promoter for improving the adhesion of films of acrylonitrile copolymers to substrates and more particularly pertains to the inclusion of a condensation product of a certain phosphate ester emulsifier, aluminum hydroxide and zinc borate in an aqueous latex of an acrylonitrile copolymer to promote adhesion of films of said acrylonitrile copolymer when they are deposited from the latex to a metallic substrate.

In an earlier co-pending U.S. patent application of Herbert Talsma and William M. Giffen, Jr., Ser. No. 878,975 filed Feb. 17, 1978, there is described a process for preparing metal-coated articles wherein the coating is deposited from an aqueous latex of an acrylonitrile copolymer. Preferred metal substrates are those selected from the group consisting of steel, tin-plated steel and aluminum. The present invention represents an improvement over the earlier filed co-pending application.

The preferred acrylonitrile copolymer latices for the purposes of the present invention are the nitrile barrier resins prepared by the polymerization of (A) from 60 to 90% by weight of at least one nitrile having the structure $$CH_2{=}C{-}CN$$
$$\phantom{CH_2{=}C{-}}|$$
$$\phantom{CH_2{=}C{-}}R$$

wherein R is hydrogen, a lower alkyl group having from 1 to 4 carbon atoms, or a halogen, and (B) from 10 to 40% by weight based on the combined weight of (A) and (B) of at least one member selected from the group consisting of (1) an ester having the structure $$CH_2{=}C{-}COOR_2$$
$$\phantom{CH_2{=}}|$$
$$\phantom{CH_2{=}}R_1$$

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure $$\phantom{CH_2{=}}R'$$
$$\phantom{CH_2{=}}|$$
$$CH_2{=}C$$
$$\phantom{CH_2{=}}|$$
$$\phantom{CH_2{=}}R''$$

wherein R' and R" are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2{=}C{-}CN$$
$$\phantom{CH_2{=}C{-}}|$$
$$\phantom{CH_2{=}C{-}}R$$

wherein R has the foregoing designation, and an ester having the structure $$CH_2{=}C{-}COOR_2$$
$$\phantom{CH_2{=}}|$$
$$\phantom{CH_2{=}}R_1$$

wherein $R_1$ and $R_2$ have the foregoing designations, said rubbery polymer containing from 50 to 100% by weight of polymerized conjugated diene and from 0 to 50% by weight of comonomer.

The nitrile barrier resins of this invention are prepared in an aqueous medium in suspension or preferably emulsion by batch, continuous or intermittent addition of monomers and other components.

Certain phosphate emulsifiers which are more completely described below will react with materials such as aluminum hydroxide, magnesium hydroxide, calcium hydroxide, zinc hydroxide, and zinc borate to form a condensation product which, when used at low concentrations in a latex of an acrylonitrile barrier resin, promotes wetting and adhesion of coatings of the latex onto metal surfaces. This permits the use of an organic solvent-free coating material in a water vehicle which eliminates many air-pollution problems now associated with the presently used organic solvent-based systems. After applying the polymer coating to the metal surface, it is preferred that the coating be baked at a temperature in the range of 150° to 300° C. The present invention permits pollution-free coating of metals for their protection with a corrosion-resistant, impermeable coating. It is preferred that the latex used for coating metal surfaces be at a pH no greater than 7 for best adhesion.

The ratio of the complex to resin in a given nitrile barrier resin latex can vary between $5 \times 10^{-7}$ and 5 parts per hundred parts of resin (phr).

The invention is further illustrated in the following examples wherein the amounts of the various ingredients are expressed in parts by weight unless otherwise specified.

EXAMPLE 1

A. A rubber latex was prepared by polymerizing with continuous agitation at 45° C. in the substantial absence of molecular oxygen a mixture of the following ingredients:

| Ingredient | Parts |
|---|---|
| acrylonitrile | 40 |
| butadiene-1,3 | 60 |
| emulsifier (Gafac RE-610)* | 2.4 |
| azobisisobutyronitrile | 0.3 |
| t-dodecyl mercaptan | 0.5 |
| water | 200 |

*A mixture of $R{-}O{-}(CH_2CH_2O{-})_nPO_3M_2$ and $[R{-}O{-}(CH_2CH_2O{-})_n]_2PO_2M$ wherein n is a number of from 1 to 40, R is an alkyl or aralkyl group and preferably a nonyl phenyl group, and M is hydrogen, ammonia or an alkali metal, which composition is sold by GAF Corporation.

Before reaction was started, the pH of the mixture was adjusted to about 8 with KOH. The polymerization was carried out for 22½ hours to a conversion of about 92% and a total solids of about 33.1%.

B. An impact-resistant gas-barrier resin was prepared by polymerizing a mixture of the following ingredients:

| Ingredient | Parts |
| --- | --- |
| acrylonitrile | 75 |
| methyl acrylate | 25 |
| rubber solids in the form of latex A (above) | 9 |
| potassium persulfate | 0.06 |
| emulsifier (Gafac RE-610) | 3 |
| modifier (n-dodecyl mercaptan) | 1 |
| water | 200 |

The pH was adjusted to about 7 with NaOH. The polymerization was carried out in the substantial absence of oxygen at 60° C. for 5 hours to produce a 91% conversion.

EXAMPLE 2

The reaction to form the condensation product was carried out in a reactor which had stirring, heating and vapor condensation means. Three grams of Gafac RE-610 emulsifier were dissolved in 100 cc's of water. To this mixture was added 1 gram of aluminum hydroxide. The mixture was stirred for 6 hours at 95° to 100° C. The reactor was then cooled to room temperature, the clear water was later removed by decanting leaving an opaque, viscous, neutral (~pH 7) product in the reactor. To this were added 5 mls. of ethanol and 100 mls. of water. The mixture was stirred with heating and additional ethanol (20 to 30 mls.) was added until a solution resulted. At this point, 1 gram of zinc borate was added and reaction was continued for 13 hours at 95° to 100° C. under a reflux condenser. The mixture was then cooled and $5 \times 10^{-3}$ parts of the mixture were added to 100 parts of the latex (w/w) described in Example 1B. The resulting treated latex was then applied to the surface of a steel 12"×6" test panel and the coating was baked at 180° to 200° C. for 3 minutes. Three different ways of coating were used in each case and a control (untreated latex of Example 1B) was also included for comparison. The three ways employed for preparing the metal coatings were (1) draw bar, (2) electrostatic spray, and (3) air spray. The results are shown below.

In each case, standard industry adhesion (tape test) and pinhole (acid test) testing of the coated metal sheets were carried out. The tape test was carried out by scribing the coating down to the metal substrate with a razor blade in a cross-hatch fashion. Standard masking tape was then adhered to the scribed area and the tape was jerked loose. Delaminated sections in the tape test constituted a failure. The pinhole test involved sprinkling drops of a solution of copper sulfate and hydrochloric acid onto the surface of the polymer coating. If the thus-treated specimen did not show evidence of corrosion after standing for 15 minutes, it passed the test.

| Coating | Acid Test | Tape Test |
| --- | --- | --- |
| *Draw Bar Testing* | | |
| control, untreated latex | failed | failed |
| treated latex | excellent | excellent |
| *Electrostatic Spray Testing* | | |
| control latex | failed | failed |
| treated latex | excellent | excellent |
| *Air Spray Testing* | | |
| control latex | failed | good |
| treated latex | excellent | excellent |

EXAMPLE 3

The same test procedure was used as is described in Example 2 with the exception that aluminum test panels were used. Test results were the same as in Example 2.

I claim:

1. In the process for coating at least one side of a metal structure with a layer of a polymer latex and then heating the resulting coating for a short time at a temperature in the range of from 150° to 300° C. wherein the polymer is prepared by the polymerization in aqueous emulsion of 100 parts by weight of (A) from 60 to 90% by weight of at least one nitrile having the structure

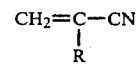

$$CH_2=\underset{R}{C}-CN$$

wherein R is hydrogen, a lower alkyl group having from 1 to 4 carbon atoms, or a halogen, and
(B) from 10 to 40% by weight based on the combined weight of (A) and (B) of at least one member selected from the group consisting of
(1) an ester having the structure

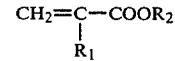

$$CH_2=\underset{R_1}{C}-COOR_2$$

wherein $R_1$ is hydrogen, an alkyl group having from 1 to 4 carbon atoms, or a halogen, and $R_2$ is an alkyl group having from 1 to 6 carbon atoms,
(2) an alpha-olefin having the structure

$$CH_2=\underset{R''}{\overset{R'}{C}}$$

wherein R' and R" are alkyl groups having from 1 to 7 carbon atoms,
(3) a vinyl ether selected from the group consisting of methyl vinyl ether, ethyl vinyl ether, the propyl vinyl ethers, and the butyl vinyl ethers,
(4) vinyl acetate,
(5) styrene, and
(6) indene, in the presence of from 0 to 40 parts by weight of
(C) a rubbery polymer of a conjugated diene monomer selected from the group consisting of butadiene and isoprene and optionally a comonomer selected from the group consisting of styrene, a nitrile monomer having the structure

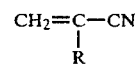

$$CH_2=\underset{R}{C}-CN$$

wherein R has the foregoing designation, and an ester having the structure

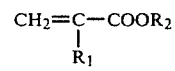

$$CH_2=\underset{R_1}{C}-COOR_2$$

wherein $R_1$ and $R_2$ have the foregoing designations, said rubbery polymer containing from 50 to 100% by weight of polymerized conjugated diene and from 0 to 50% by weight of comonomer, the improvement comprising including in said polymer latex before it is used for coating the metal surface a complex of a phosphate emulsifier, said emulsifier being a mixture of R-O-(CH$_2$CH$_2$O-)$_n$PO$_3$M$_2$ and [R-O-(CH$_2$CH$_2$O-)$_n$]$_2$PO$_2$M wherein n is a number of from 1 to 40, R is an alkyl or aralkyl group and preferably a nonyl phenyl group, and M is hydrogen, ammonia or an alkali metal, and at least one member selected from the group consisting of aluminum hydroxide, magnesium hydroxide, calcium hydroxide, zinc hydroxide, and zinc borate.

2. The process of claim 1 wherein (A) is acrylonitrile.

3. The process of claim 2 wherein (B) is methyl acrylate.

4. The process of claim 3 wherein (B) is styrene.

* * * * *